No. 752,617. Patented February 16, 1904.

UNITED STATES PATENT OFFICE.

FRANK H. DE PUE, OF SAN FRANCISCO, CALIFORNIA.

METHOD OF IDENTIFICATION.

SPECIFICATION forming part of Letters Patent No. 752,617, dated February 16, 1904.

Application filed May 31, 1902. Serial No. 109,584. (No model.)

*To all whom it may concern:*

Be it known that I, FRANK H. DE PUE, a citizen of the United States, residing at San Francisco, in the county of San Francisco and State of California, have invented a certain new and useful Improvement in Methods of Identification, of which the following is a specification.

My invention relates to a method of identification of individuals. Its use may be illustrated in connection with the identification of criminals, though of course it is applicable to identification generally.

In identification bureaus or offices it is common to possess the photographs of criminals or persons suspected of being criminals. When, perhaps after a lapse of years, a person identified or supposed to be identified with some criminal act is apprehended, it is immediately desirable to be able to compare the record of such person with the records of the criminal classes, to, if possible, identify him with some person previously apprehended as a criminal, and thus come into possession of his history or a portion of it. This identification of course is carried out or attempted in various ways and by various methods.

According to my process it is only necessary to take a photograph of the criminal in some attitude which will be as nearly as possible similar to the standard attitude applied for the purpose of carrying out my system. This photograph or picture may now be properly prepared so that it can be projected upon a screen. All other pictures in the possession of such bureaus of identification will be correspondingly prepared for projection upon a screen. Such pictures will of course naturally divide themselves into classes or groups, and there will be some class or group which will be sufficiently similar to the last picture taken to suggest the identity of the person represented in the last picture with some one of the persons represented in such group.

I will illustrate my process of comparison by the accompanying drawings, wherein—

Figure 1:
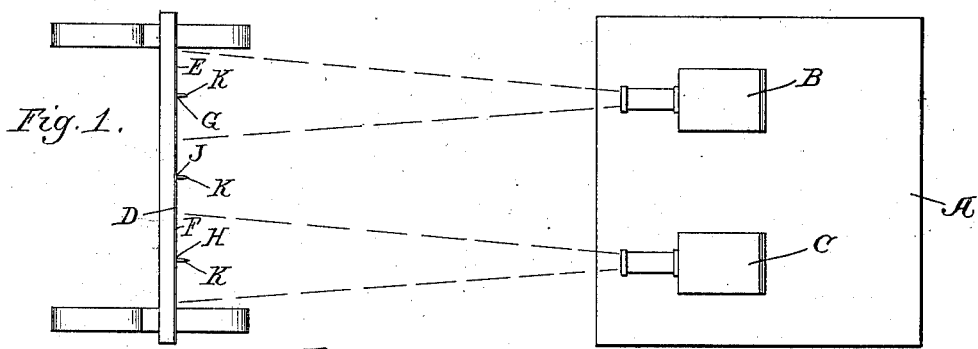
Figure 2:
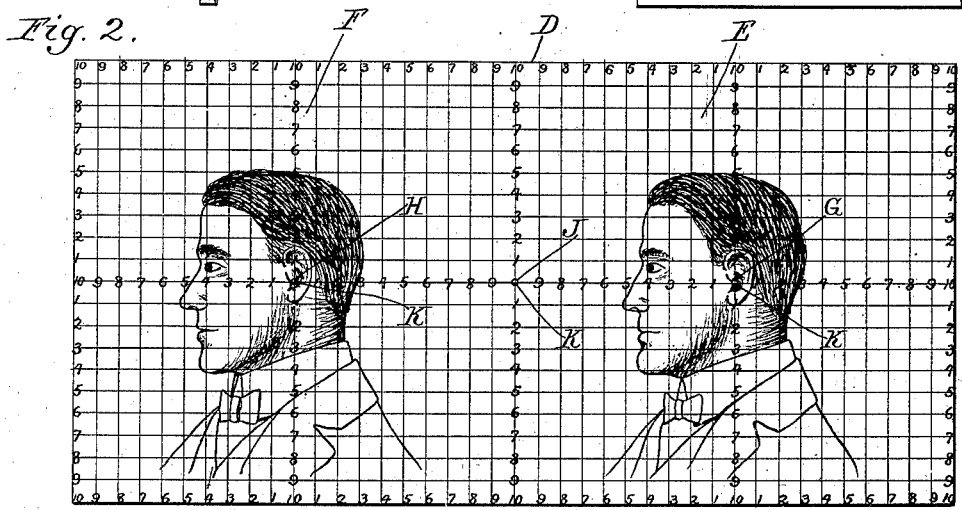
Figure 3:
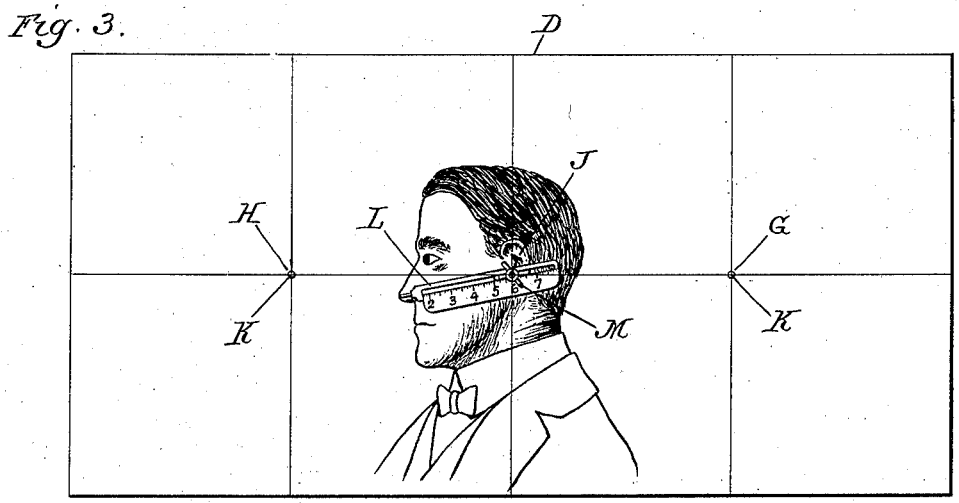

Figure 1 is a plan view of devices for projecting the pictures upon the screen, with screen in position. Fig. 2 is a view of a screen having two sections, each with its own ruling-lines and with a picture projected upon it for comparison. Fig. 3 is a view of a screen with the two pictures superimposed in the middle of the screen.

Like parts are indicated by the same letter in all the figures.

A is a table on which is mounted in any desired manner the projecting-lanterns B C. They are preferably movable, so that the picture projected by either may be made to travel along the screen from one position to another. D is a screen suitably placed in front of these lanterns. This screen has at one portion a ruled and measured surface E and at another portion a similar ruled and measured surface F. On each of these surfaces is preferably arranged a center of measurement marked, respectively, G and H. Any desired scale can be used. If a center of measurement is used, as indicated, the lines regularly laid off, as indicated, could be properly numbered in each direction from such center for convenience in comparison, as indicated in Fig. 2. As shown in Fig. 2, these two ruled portions E and F are closely united side by side, being, in effect, ruled portions of a long screen divided by a middle line. It will be convenient to have a center of measurement J intermediately between the two surfaces. The ruling may be dispensed with, as indicated in Fig. 3, where I have shown such a screen; but in this event the proper comparison would take place when the two pictures are superimposed. At each of the centers of measurement I preferably arrange a small projecting post or pivot K, on which may be mounted the rule or scale L, the same being slotted to permit the passage of the pivot therethrough. On the pivot is preferably the thumb-nut M, whereby the scale can be fixed in any desired position, the scale being slotted, as stated, to facilitate its motion. By this means any desired measurement can be taken from point to point from the surface of the picture projected on the screen.

We first take a picture, preferably one that can be projected from the photograph itself, and project the likeness upon the screen—as, for example, by means of the lantern B upon the ruled surface E. Some central point of the picture is made to coincide with the center of measurement, and the picture is adjusted so as to bring it in an upright position. It is also adjusted so that the picture thrown upon the screen is desired size. It will be seen that immediately the superimposing of such pictures upon the ruled surface will give all of the measurements along the right lines, and they can be instantly taken off by reference to the numerals. Oblique measurements can be readily taken by means of the rotating rule. This rule being mounted upon the pivot or post J, as before described, can then be swung around such post or pivot until it falls into the proper position of coincidence with any particular line of which measurement is to be taken. The scale on the rule will of course indicate the length of such line between the central point or pivot-point and the point to which the line runs. Any kind of a ruled scale capable of rotation about a pivot-point will serve the purpose. The thumb-nut and pivot-post are adapted to hold the rule in proper relation at the central point of rotation in connection with which the measurement is to be taken. We now take one of the pictures to be compared and go through the same process. It is easy thus to compare accurately line by line and dimension by dimension the two pictures. When this comparison has been sufficiently made, the two pictures may be superimposed either on the ruled lines or on the blank surface, and by this comparison we can readily determine the matter of identity. The process is one which can be carried on very rapidly, for in certain well-defined dimensions not here necessary to enumerate a slight variation instantly removes the suspicion of identity, and when two pictures have been found which closely coincide the most accurate and perfect comparison can be made by the use of either the rotating rule or the ruled surfaces or by superimposing the pictures or by any two or all three of these divisions of the process. I have used the term "axes" or "lines of direction" with reference to these several figures or pictures to indicate for each some established line—that is to say, a given line will be established for a given picture which will bear a certain definite relation, for example, to the eye and ear of such picture, and other such lines may be established. These I call the "axes" or "lines of direction" of such picture or photograph. For example, in Fig. 2 I have shown that through the center of the ear two ruled and scaled lines have been drawn at right angles to each other with the head placed as nearly as possible so that the vertical line of the face is parallel with the vertical line through the ear. These lines are established for convenience in describing and comparing the several figures.

By adjusting the positions of the devices for projecting the photographs or pictures or by adjusting their lines it is evident that the size of the picture projected upon the screen may be varied, and in this way each picture may be brought to a certain standard of size or scale, and for purposes of comparison they should be brought to the same scale on the screen or as nearly as may be convenient. The comparison may be made without making this scale absolutely the same; but for convenience they should be brought as nearly as possible to the same scale.

I claim—

1. The method of identification consisting in projecting the picture of a known subject onto a smooth surface, projecting a picture of a suspected subject onto an associated smooth surface, relatively adjusting the projections to substantial uniformity as to size and angular position and taking relative measurements of the projected pictures.

2. The method of identification consisting in projecting the picture of a known subject onto a screen, projecting a picture of a suspected subject onto a screen, relatively adjusting the projections to substantial uniformity as to size and angular position, taking relative measurements of the projected pictures, and superimposing the adjusted projections.

3. A method of identification which consists in comparing a photograph of a known subject with a photograph of the subject to be identified by projecting the photograph of the known subject onto a ruled screen, projecting the photograph of the subject to be identified onto a similar ruled screen, bringing the projected images to the same scale and a similar point on each to a like center on its ruled surface, and taking off and comparing the several measurements from such center of the two images.

4. A method of identification which consists in comparing a photograph of a known subject with a photograph of the subject to be identified by projecting the photograph of the known subject onto a ruled screen, projecting the photograph of the subject to be identified onto a like ruled screen whose ruled lines are parallel with the corresponding ruled lines of the first-mentioned ruled screen; bringing the projected images to the same scale and a similar point on each to a like center on its ruled surface, so that each image occupies the same relative position to the lines on its screen as the other, and taking off and comparing the several measurements taken from such center of the two images.

FRANK H. DE PUE.

Witnesses:
HOMER L. KRAFT,
EDWARD T. WRAY.